(12) United States Patent
Kuo et al.

(10) Patent No.: US 9,784,831 B2
(45) Date of Patent: Oct. 10, 2017

(54) PRE-WARNING METHOD AND VEHICLE RADAR SYSTEM

(71) Applicant: Wistron NeWeb Corporation, Hsinchu (TW)

(72) Inventors: Chi-Cheng Kuo, Hsinchu (TW); Hsin-Lung Hsiao, Hsinchu (TW); Jeng-Da Li, Hsinchu (TW)

(73) Assignee: Wistron NeWeb Corporation, Hsinchu (TW)

( * ) Notice: Subject to any disclaimer, the term of this patent is extended or adjusted under 35 U.S.C. 154(b) by 308 days.

(21) Appl. No.: 14/698,867

(22) Filed: Apr. 29, 2015

(65) Prior Publication Data

US 2016/0054441 A1     Feb. 25, 2016

(30) Foreign Application Priority Data

Aug. 20, 2014   (TW) .............. 103128710 A (51) Int. Cl.
*G01S 13/02*     (2006.01)
*G01S 13/93*     (2006.01)
(Continued)

(52) U.S. Cl.
CPC ............ *G01S 13/931* (2013.01); *G01S 7/006* (2013.01); *G01S 7/03* (2013.01); *G01S 7/35* (2013.01);
(Continued)

(58) Field of Classification Search
CPC ...... G01S 13/345; G01S 13/87; G01S 13/931; G01S 2013/936; G01S 7/006; G01S 7/03; G01S 7/35
(Continued)

(56) References Cited

U.S. PATENT DOCUMENTS 6,992,613 B2   1/2006   Yoneda
7,592,945 B2   9/2009   Colburn
(Continued)

FOREIGN PATENT DOCUMENTS

CN   1808177 A   7/2006
CN   2886598 Y   4/2007
(Continued)

OTHER PUBLICATIONS

Jeng-Da Li et al., Title: Pre-warning Method and Vehicle Radar System, pending U.S. Appl. No. 14/700,153, filed Apr. 30, 2015.
(Continued)

*Primary Examiner* — Timothy A Brainard
(74) *Attorney, Agent, or Firm* — Winston Hsu (57) ABSTRACT

A pre-warning method utilized in a vehicle radar system is disclosed. The vehicle radar system includes a frequency-modulation continuous wave (FMCW) module, a data transceiver module and an antenna module, and the FMCW module and the data transceiver module share the antenna module. The pre-warning method includes the FMCW module utilizing the antenna to transmit and receive beat signals to detect dynamic information of a target corresponding to the vehicle radar system and obtain a first detection result, and receiving and broadcasting data to broadcast the first detection result via the data transceiver module and the antenna module, or receive a detection result broadcasted by another vehicle radar system and combine the detection result with the first detection result to perform real-time target tracking and alarm.

12 Claims, 12 Drawing Sheets

(51) Int. Cl.
    *G01S 7/35*     (2006.01)
    *G01S 7/00*     (2006.01)
    *G01S 7/03*     (2006.01)
    *G01S 13/87*     (2006.01)
    *G01S 13/34*     (2006.01)

(52) U.S. Cl.
    CPC ............ *G01S 13/87* (2013.01); *G01S 13/345* (2013.01); *G01S 2013/936* (2013.01)

(58) Field of Classification Search
    USPC .......................................................... 342/73
    See application file for complete search history.

(56) References Cited

U.S. PATENT DOCUMENTS

| | | | |
|---|---|---|---|
| 7,777,618 | B2 | 8/2010 | Schiffmann |
| 8,818,703 | B2 | 8/2014 | Harada |
| 8,935,086 | B2 | 1/2015 | Sadekar |
| 9,283,910 | B2 | 3/2016 | Tsunekawa |
| 9,297,892 | B2 | 3/2016 | Smith |
| 2009/0201192 | A1 | 8/2009 | Tokoro |
| 2011/0080314 | A1 | 4/2011 | Wintermantel |
| 2013/0063297 | A1 | 3/2013 | Papziner |
| 2013/0226432 | A1* | 8/2013 | Tsuruta ............... B60W 30/165 701/96 |
| 2013/0304365 | A1* | 11/2013 | Trombley .......... G08G 1/09626 701/117 |
| 2014/0139368 | A1 | 5/2014 | Takaki |
| 2014/0297171 | A1 | 10/2014 | Minemura |

FOREIGN PATENT DOCUMENTS

| | | |
|---|---|---|
| CN | 101625797 A | 1/2010 |
| CN | 101354438 B | 12/2011 |
| CN | 103661097 A | 3/2014 |
| EP | 1684092 A1 | 7/2006 |

OTHER PUBLICATIONS

Huang, Title of Invention: Radio-Frequency System, U.S. Appl. No. 14/691,547, filed Apr. 20, 2015.

\* cited by examiner

PRE-WARNING METHOD AND VEHICLE RADAR SYSTEM

BACKGROUND OF THE INVENTION

1. Field of the Invention

The present invention relates to a pre-warning method and a vehicle radar system, and more particularly, to a pre-warning method and a vehicle radar system capable of exchanging roadway information or environment condition between vehicles via vehicle to vehicle communication or vehicle to roadside system communication, so as to aid or improve vehicle pre-warning systems and to enhance pre-warning accuracy.

2. Description of the Prior Art

As traffic safety is more important, vehicle safety equipment is getting more various. In addition to active or passive safety systems (such as anti-lock braking system, electronic brake-force distribution system, traction control system, electronic stability system, supplementary restraint system, etc.), pre-warning protection systems attract more attention. The pre-warning protection system uses an image self-recognition method of machine vision to detect possible situation which may cause danger, and sends out a warning light signal or an alarm sound to a driver in advance. The driver may change a driving direction according to the alarm signals, to avoid a traffic accident due to the driver's careless or blind side of vision.

A common pre-warning protection system, such as a blind spot detection system, an automatic braking system, a forward/rear collision warning system, a lane departure warning system, utilizes a frequency-modulated continuous waveform (FMCW) radar system in microwave form to perform target detections. These detections are performed by radar systems to detect outside environment of the vehicle or moving conditions of targets, so as to inform the driver adequately. However, the accuracies of the radar systems are affected by radar angles or efficiencies; in addition, since the outside environment and surrounding traffic condition are changing as the vehicle drives, the traditional pre-warning protection systems are easily affected by terrain, ground objects, or traffic conditions, and cause miss detection or false alarm, which causes disturbance of the driver or even dangerous accidents. For example, when a former vehicle and a latter vehicle drive on a single two-way lane and the former vehicle is slower and the latter vehicle is approaching the former vehicle, a forward collision warning system of the latter vehicle may not correctly determine the traffic condition in the front due to blocking of the former vehicle. If there is a fast approaching vehicle in the opposite direction, and the driver of the latter vehicle does not notice and overtakes the former vehicle, an accident may thus happen.

As can be seen from the above, since the vehicle radar systems of the prior art only detect outside environment or targets moving condition, miss detections and false alarms might happen because of outside traffic and environment. Therefore, how to enhance a pre-warning accuracy of the vehicle pre-warning systems is a significant objective in the field.

SUMMARY OF THE INVENTION

It is therefore a primary objective of the present invention to provide a pre-warning method and a vehicle radar system to improve disadvantages of the prior art.

An embodiment of the present invention discloses pre-warning method, utilized in a vehicle radar system. The vehicle radar system comprises a frequency-modulation continuous wave (FMCW) module, a data transceiver module and an antenna module, and the FMCW module and the data transceiver module share the antenna module. The pre-warning method comprises the FMCW module utilizing the antenna module to transmit and receive beat signals, to detect dynamic information of a target corresponding to the vehicle radar system, and obtaining a first detection result; and broadcasting the first detection result via the data transceiver module and the antenna module.

An embodiment of the present invention further discloses a vehicle radar system, utilized for a vehicle. The vehicle radar system comprises a substrate, comprising a first plane and a second plane; an antenna module, comprising a plurality of antenna strings, formed on the first plane of the substrate, each comprising a plurality of radiating units connected in a sequence, wherein the plurality of antenna strings are classified into a first group and a second group; a plurality of wires, formed on the second plane of the substrate, for transmitting radio-frequency (RF) signals; a plurality of connecting units, disposed in the substrate, for coupling the plurality of wires and antenna strings of the second group within the plurality of antenna strings; a FMCW module, coupled to antenna strings of the first group within the plurality of antenna strings, for transmitting or receiving RF signals via the antenna strings of the first group, to detect dynamic information of a plurality of targets corresponding to the vehicle radar system; a data transceiver module, coupled to the plurality of wires, for coupling to the antenna strings of the second group through the plurality of wires and the plurality of connecting units, to transmit or receive RF signals via the antenna strings of the second group, so as to perform data transmission and reception; and a data fusion unit, for integrating a detection result of the FMCW module and a data transceiving result of the data transceiver module; wherein when the FMCW module transmits or receives RF signals via the antenna strings of the first group, a first electric field generated by the antenna strings of the first group extends toward a first direction, and when the data transceiver module transmits or receives RF signals via the antenna strings of the second group, a second electric field generated by the antenna strings of the second group extends toward a second direction different from the first direction; wherein at least an antenna string of the plurality of antenna strings belongs to both the first group and the second group.

These and other objectives of the present invention will no doubt become obvious to those of ordinary skill in the art after reading the following detailed description of the preferred embodiment that is illustrated in the various figures and drawings.

DETAILED DESCRIPTION

Since conventional vehicle radar systems only actively detect outside environment or targets moving condition, miss detections and false alarms might happen because of outside traffic and environment. In order to enhance an accuracy of the vehicle radar systems, an embodiment of the present invention utilizes radars to perform vehicle to vehicle communication or vehicle to roadside system communication, such that roadway information or environment condition may be exchanges between vehicles, so as to aid or improve vehicle pre-warning systems and enhance pre-warning accuracy. In addition, different from the conventional art, a single antenna module is utilized for both detecting outside environment or targets moving condition and performing vehicle to vehicle communication or vehicle to roadside system communication, which reduces complexity of the vehicle radar system.

Figure 1:
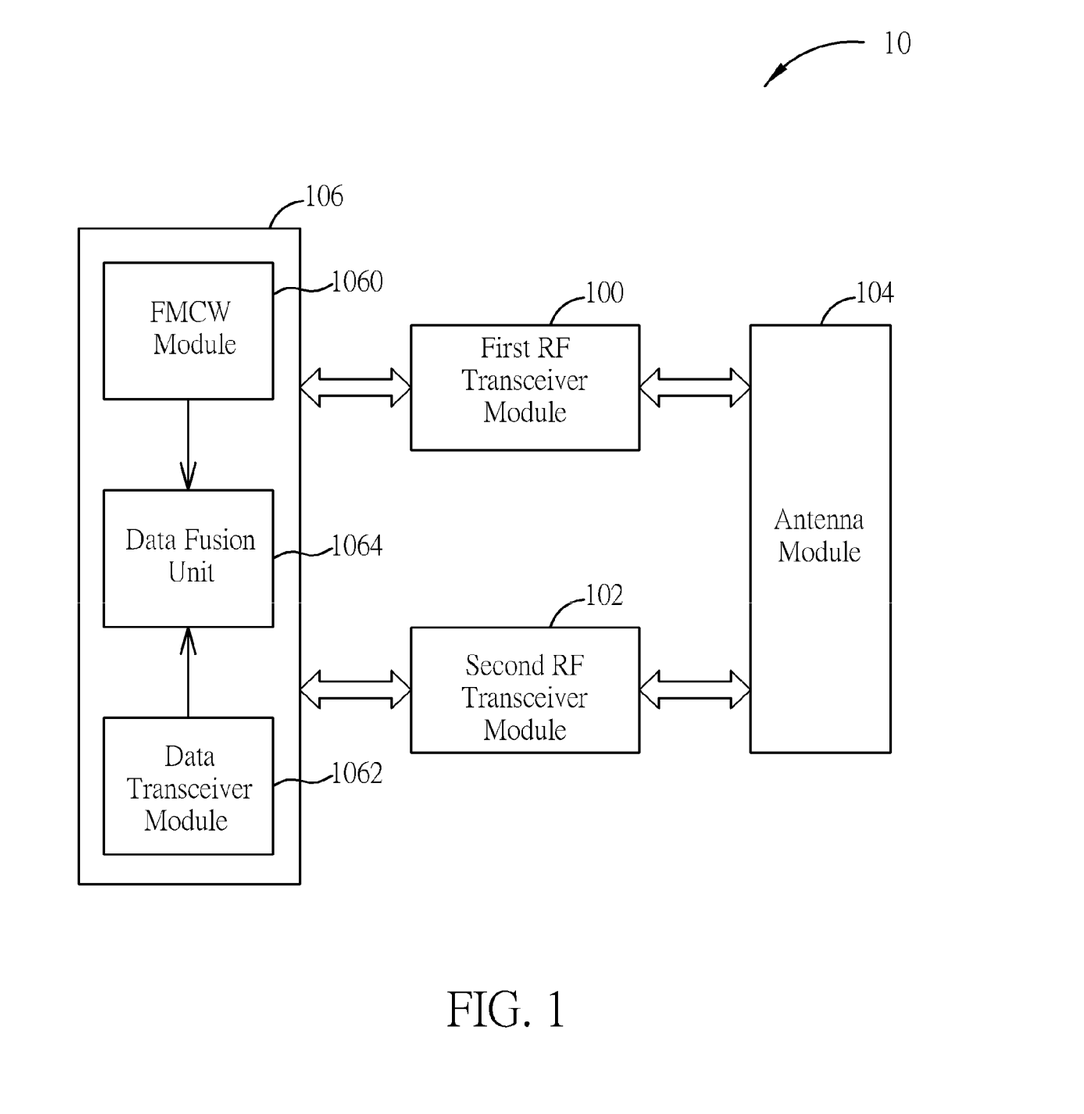
FIG. 1 is a schematic diagram of a vehicle radar system according to an embodiment of the present invention.

Please refer to FIG. 1, which is a schematic diagram of a vehicle radar system 10 according to an embodiment of the present invention. The vehicle radar system 10 may detect roadway environment to provide a warning in advance according to possible traffic condition, and perform data communication to enhance pre-warning accuracy. The vehicle radar system 10 comprises a first radio-frequency (RF) transceiver module 100, a second RF transceiver module 102, an antenna module 104 and a signal processing module 106. The antenna module 104 comprises one or more receiving antennas and one or more transmitting antennas, which are shared by the first RF transceiver module 100 and the second RF transceiver module 102, to perform roadway environment detection and data transmission and reception. The first RF transceiver module 100 and the second RF transceiver module 102 may respectively comprise components such as wires, power dividers, etc., and share the antenna module 104 through arrangement using connecting lines to achieve polarization in different directions. In another perspective, the signal processing module 106 comprises a frequency-modulated continuous waveform (FMCW) module 1060, a data transceiver module 1062 and a data fusion unit 1064. The FMCW module 1060 transmits and receives millimeter wave wireless signals through the first RF transceiver module 100 and the antenna module 104 to perform operations such as range measurement, target detection, etc. The data transceiver module 1062 performs data communication with other vehicles and a roadside system through the second RF transceiver module 102 and the antenna module 104 to provide information such as traffic condition, car speeds, surround target information, etc.

Figure 6:
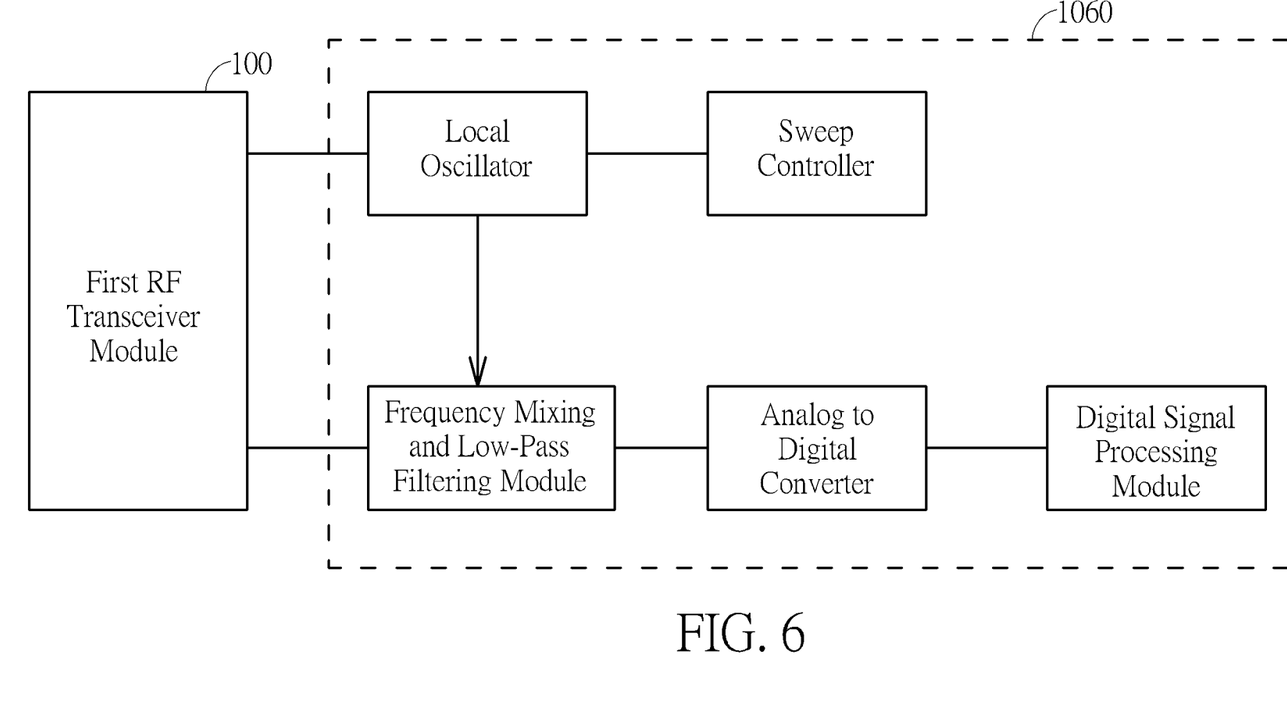
FIG. 6 is a schematic diagram of an embodiment of a frequency-modulated continuous waveform (FMCW) module shown in FIG. 1.

Utilizing millimeter wave wireless signal to sense targets is known in the art, which is briefly narrated as follows. In an embodiment, as shown in FIG. 6, the FMCW module 1060 comprises components such as a local oscillator, a sweep controller, a frequency mixing and low pass filtering module, an analog to digital converter, a digital signal processing module, etc. Moreover, the sweep controller controls the local oscillator to generate FMCW signals or other extensions of FMCW signals, and emits the FMCW signals outward through the first RF transceiver module 100 and the antenna module 104. Correspondingly, the first RF transceiver module 100 and the antenna module 104 receives signals reflected from targets, the frequency mixing and low pass filtering module performs frequency mixing on the reflected signals with the sinusoidal signal generated by the local oscillator and performs low pass filtering, to obtain beat frequency between these two signals. The analog to digital converter converts the beat frequency signals into digital signals. The digital signal processing module computes and obtains information such as ranges, angles, moving speeds, etc., of the targets in relation to the vehicle radar system 10.

Figure 7:
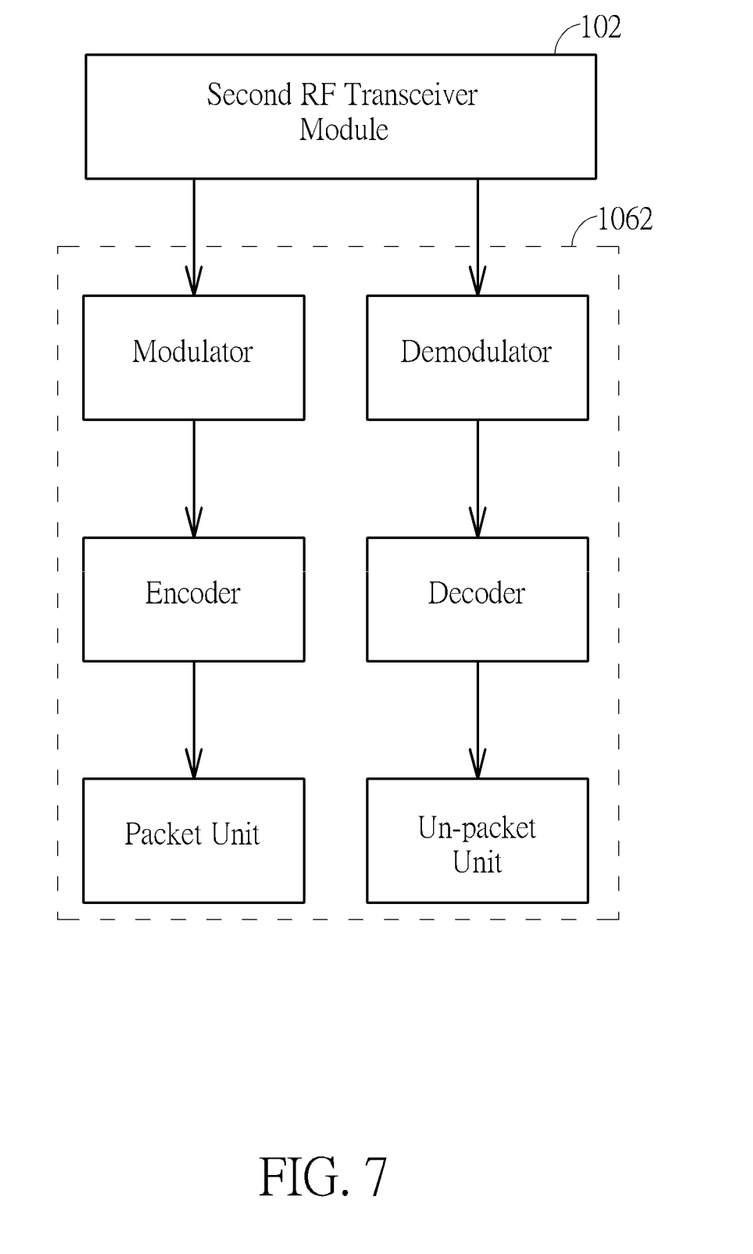
FIG. 7 is a schematic diagram of an embodiment of a data transceiver module shown in FIG. 1.

In addition, using wireless signals to perform data transmission and reception is also known in the art, which is briefly narrated as follows. In an embodiment, as shown in FIG. 7, the data transceiver module 1062 comprises a packet unit, an encoder, a modulator, a demodulator, a decoder, an un-packet unit, etc. When there is data to be transmitted, the packet unit may convert the data to be transmitted into binary data packets with equal size, and append different headers according to different signals. The encoder may perform encoding on the data packets. The modulator may modulate the encoding results on a specific carrier waveform to be transmitted through the antenna module 104. Correspondingly, when receiving data, the demodulator converts RF signals received by the antenna module 104 into an inter-frequency (IF) band or a baseband, such that the decoder may decode the down-converted signals. The un-packet unit may analyze the decoding results and recover as the data packets. Notably, there are many ways using wireless signal to perform data transmission, and those skilled in the art may realize the data transceiver module 1062 according to system requirements. For example, an encryption/decryption unit may be included to encrypt certain special data, or a compression and decompression process may be included, which may also be applied to the present invention, and not limited herein.

As can be seen from the above, in the signal processing module 106, the FMCW module 1060 detects dynamic information (such as ranges, moving speeds, angles, etc.) of targets in relation to the vehicle radar system 10 using the beat frequency signals, and the data transceiver module 1062 performs wireless data transmission and reception. The FMCW module 1060 and the data transceiver module 1062 share the antenna module 104. The data fusion unit 1064 may integrate or utilize the results obtained from the FMCW module 1060 and the data transceiver module 1062, to enhance an accuracy of detection or aid other vehicles to perform detection. For example, in an embodiment, the data transceiver module 1062 may receive information from other vehicles or system, e.g., target information detected by other vehicles, and the data fusion unit 1064 may integrate the received information with the results detected by the FMCW module 1060, to avoid miss detections or false alarms because of terrain, ground objects, or traffic conditions. In another embodiment, the data fusion unit 1064 may broadcast or send out the results detected by the FMCW module 1060 via the data transceiver module 1062 to other vehicles or system, such that other vehicles may obtain traffic condition in advance, so as to avoid miss detections or false alarms because of terrain, ground objects, or traffic conditions.

For example, please refer to FIGS. 2A to 2D, which are schematic diagrams of embodiments of vehicle to vehicle communication using the vehicle radar system 10. In FIGS. 2A to 2D, vehicles A, B are equipped with the vehicle radar system 10, and form radar ranges FRG_A, RRG_A, FRG_B, RRG_B in fronts and rears of the vehicles A, B. The radar ranges FRG_A, RRG_A, FRG_B, RRG_B represent detecting ranges of FMCW or data transmission ranges, which can be modified according to different requirements. Meanwhile, according to different applications, the vehicles A, B may be two cars performing an automatic car following, or merely two cars in a random occurrence. The so called "automatic car following" means that the vehicle B follows a driving direction and a car speed of the vehicle A, to achieve either automatic or semi-automatic driving operation. For example, the vehicle B may detect information (such as a range, an angle, a car speed, etc.) of the vehicle A through the FMCW module 1060. The vehicle B may automatically maintain a driving direction and a car speed which are substantially the same as the vehicle A, or send out an indication message to a driver to semi-automatically maintain the driving direction and the car speed which are substantially the same as the vehicle A. Notably, the automatic car following operation is an application of the present invention. As stated in the above, the vehicles A, B may be two cars within a random occurrence, not limited to the automatic car following operation. Moreover, FIGS. 2A to 2D are meant to illustrate an application performing vehicle to vehicle communication using the vehicle radar system 10, but not limited herein. Applications which integrate or utilize results obtained from the FMCW module 1060 and the data transceiver module 1062 to enhance detecting accuracy or aid other vehicles to perform detection are within the scope of the present invention.

Figure 2A:
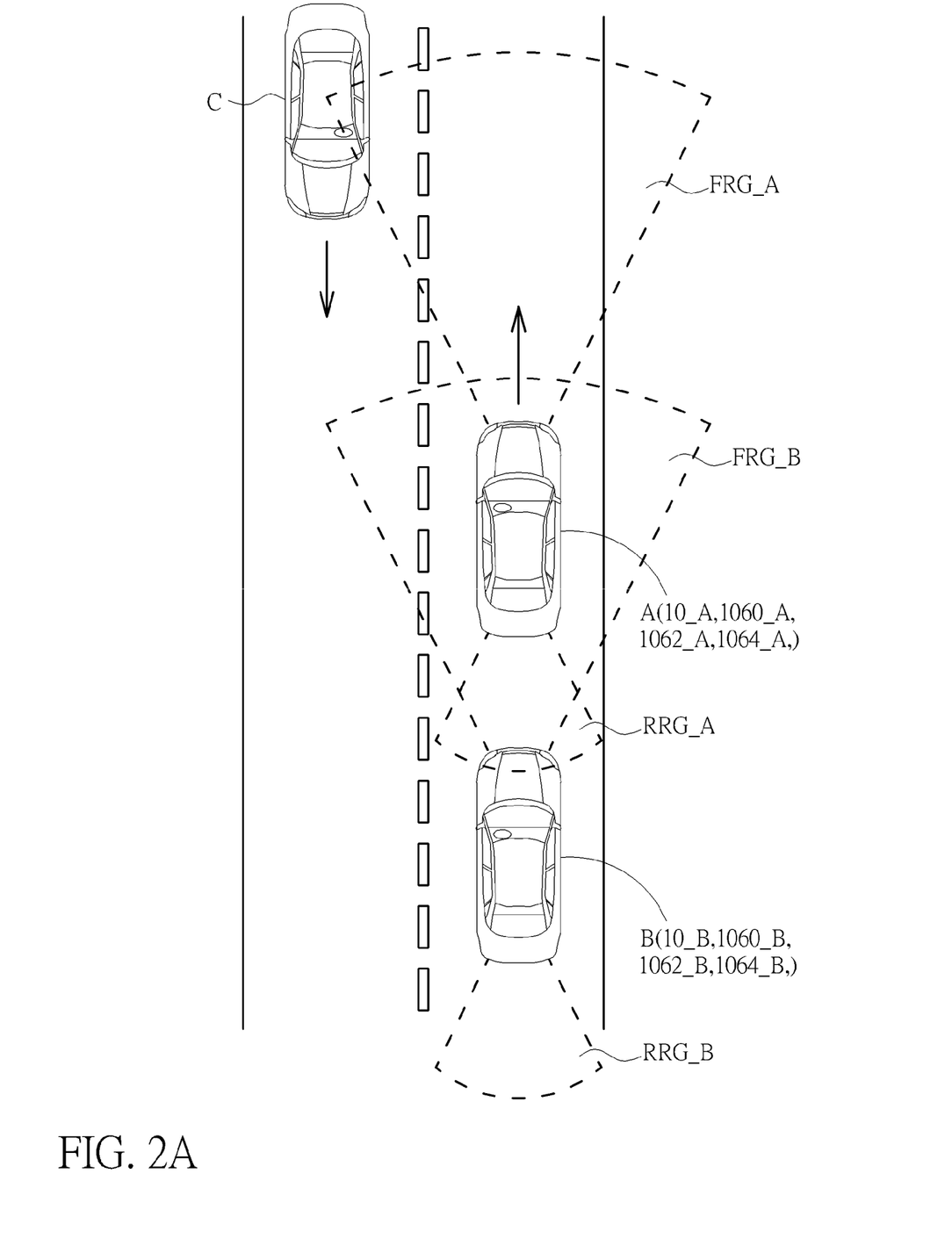
FIG. 2A to 2D are schematic diagrams of embodiments of vehicle to vehicle communication using the vehicle radar system shown in FIG. 1.

For brevity, the vehicle radar systems 10 disposed on the vehicles A, B are denoted as vehicle radar systems 10_A, 10_B, and the FMCW modules 1060, the data transceiver modules 1062 and the data fusion units 1064 included are represented as the FMCW modules 1060_A, 1060_B, the data transceiver modules 1062_A, 1062_B and the data fusion units 1064_A, 1064_B, respectively, which are clearly shown in FIGS. 2A to 2D. First, as shown in FIG. 2A, according to a driving direction, the vehicle A is in front of the vehicle B. When the FMCW module 1060_A detects a vehicle C (within the radar range FRG_A) in a front of the vehicle A, since the vehicle C does not enter the radar range FRG_B of the vehicle B yet, to raise a radar visibility of the vehicle B, the data fusion unit 1064_A of the vehicle A may send the detecting results of the FMCW module 1060_A to the data transceiver module 1062_A, and send related information (such as a range, an angle, a car speed) of the vehicle C backward to the data transceiver module 1062_B of the vehicle B via broadcasting or point-to-point transmission (within the radar range RRG_A). Therefore, the data transceiver module 1062_B of the vehicle B may receive information in advance indicating that there is a target approaching. The data fusion unit 1064_B may integrate the information with the detecting results of the FMCW module 1060_B, so as to perform pre-warning or determine target information in advance, or to verify the detecting results of the FMCW module 1060_B. In such a situation, even if the FMCW module 1060_B of the vehicle B breaks down or is interfered, which causes that the radar range FRG_B is reduced, the vehicle B may still be able to identify targets by information sent from the vehicle A according to the embodiment of the present invention, to enhance traffic safety.

Figure 2B:
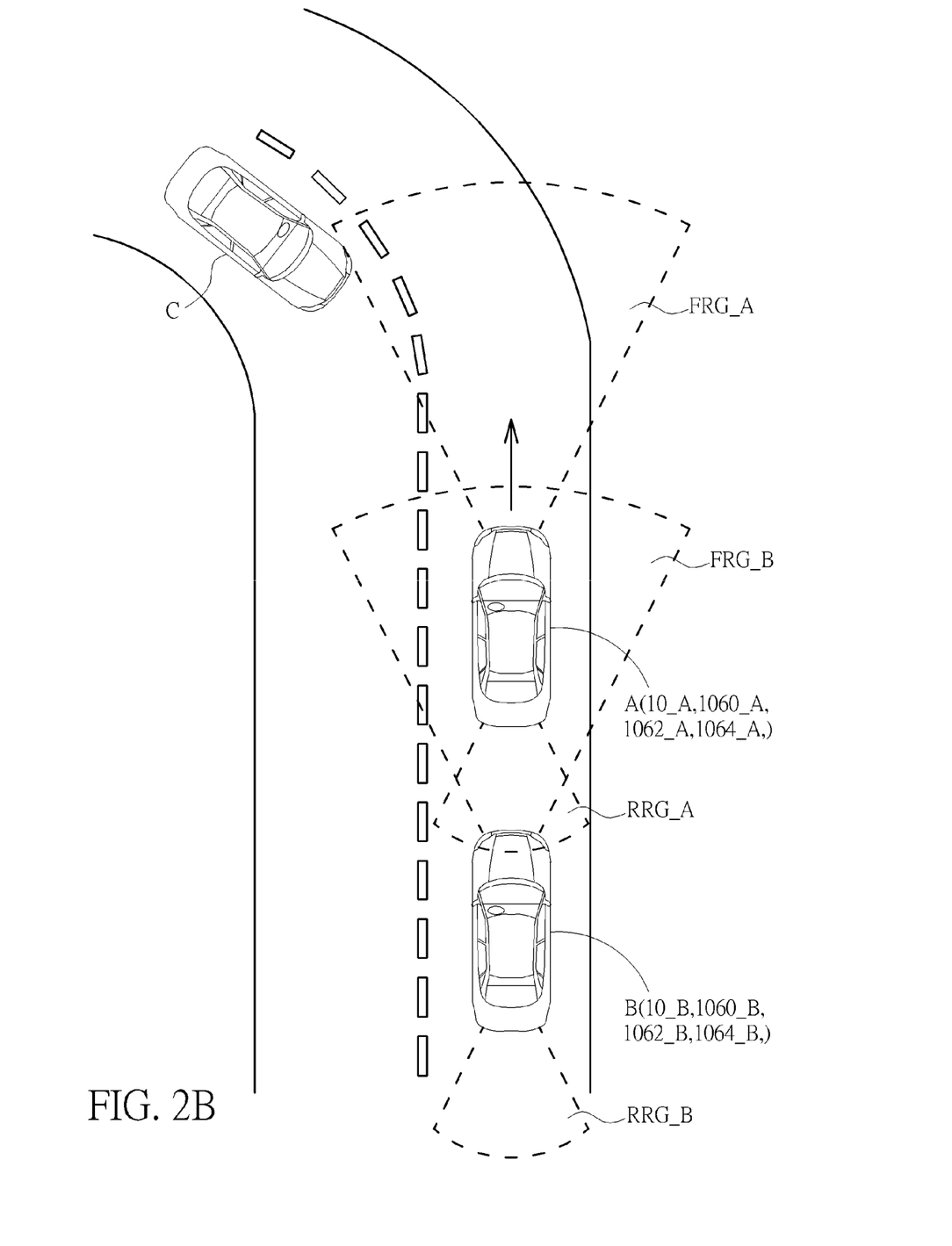

Continuing from the embodiment of FIG. 2A, if the vehicles A, B, C drive in a curved roadway, as shown in FIG. 2B, the vehicle B may not detect targets in the oncoming traffic lane (i.e., the vehicle C) since the radar range FRG_B is affected by the curved angle of the curved roadway. In such a situation, the data transceiver module 1062_A of the vehicle A may send related information of the vehicle C to the data transceiver module 1062_B of the vehicle B via broadcasting or point-to-point transmission. Therefore, even if the FMCW module 1060_B of the vehicle B is not able to detect the vehicle C instantly because of terrain, according to the embodiment of the present invention, the vehicle B may still be able to identify targets by information sent from the vehicle A, to enhance traffic safety.

Figure 2C:
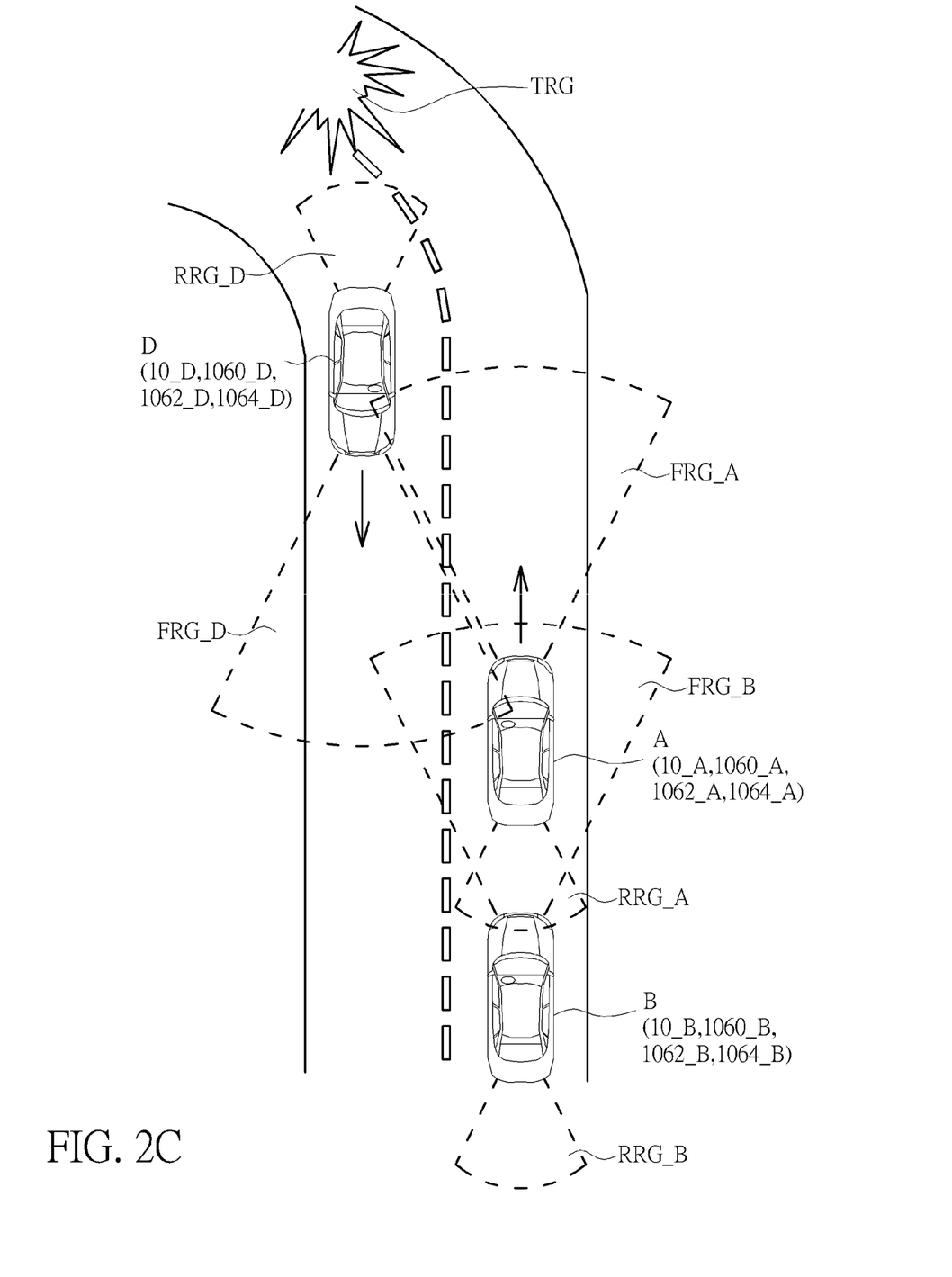

In addition, as shown in FIG. 2C, if a vehicle D drives toward the vehicles A, B, the vehicle radar system 10 (denoted as 10D) of the present invention is also disposed on the vehicle D, and the radar ranges FRG_D, RRG_D are formed in a front and in a rear of the vehicle D, wherein the FMCW module 1060, the data transceiver module 1062 and the data fusion unit 1064 thereof are represented as the FMCW module 1060_D, the data transceiver module 1062_D and the data fusion unit 1064_D, respectively. If the FMCW module 1060_D of the vehicle D detects an abnormal target TRG while driving (e.g., a suddenly moving object which is static for a long time, a suddenly stopped object or a deviating object), according to the embodiment of the present invention, the vehicle D may send information of the abnormal target TRG to the vehicle A or B through the radar range FRG_D, or send the information to the vehicle A first and then the vehicle A may send the information to the vehicle B. Therefore, the vehicles A, B may send out an alarm signal to the drivers in prior to the vehicles A, B approaching the abnormal target TRG, such that the drivers may make preparation in advance, to reduce a probability of dangerous accidents.

Furthermore, in FIG. 2C, for the vehicles A, B, the abnormal target TRG is outside the visible ranges of the radars of the vehicles A, B and not able to be detected instantly because of terrain (i.e., the curved roadway). Using vehicle to vehicle communication, the drivers of the vehicles A, B may make preparation in advance. Moreover, rules determining the abnormal target TRG may be modified according to different roadway condition, which are not limited to suddenly moving after being static for a long time, suddenly stopped, suddenly deviating, etc. Rules of the vehicle D sending out the abnormal target TRG may also be adequately modified. For example, broadcasting in a specific time (e.g., 1 minute) or a specific range (e.g., 1 kilometer) after the abnormal target TRG is detected. In addition, to prevent confusion on the drivers, the detecting results obtained from the self-vehicle and the detecting results obtained from other vehicles may be represented in different ways. Take FIG. 2C as an example, if the vehicle A detects the abnormal target TRG, the vehicle A may use an urgent warning tone to inform the drivers. If the vehicle A receives the detecting results obtained from the vehicle D, the vehicle A may use a moderate warning tone to inform the drivers. Therefore, the driver may distinguish sources of the detecting results, to prevent confusion.

In the embodiment stated in the above, the radar ranges (such as FRG_A, RRG_A, FRG_B, RRG_B, FRG_D, RRG_D) represent the radar disposal locations of the vehicle radar system 10. Those skilled in the art may adequately modify the angles, directions or applications thereof. For example, in an embodiment, front radar ranges may only be used for detection of the FMCW module 1060, while rear radar ranges may only be used for data exchanging of the data transceiver module 1062. In another embodiment, front and rear radar ranges may be used for both detection of the FMCW module 1060 and data exchanging of the data transceiver module 1062, which is also within the scope of the present invention.

Figure 2D:
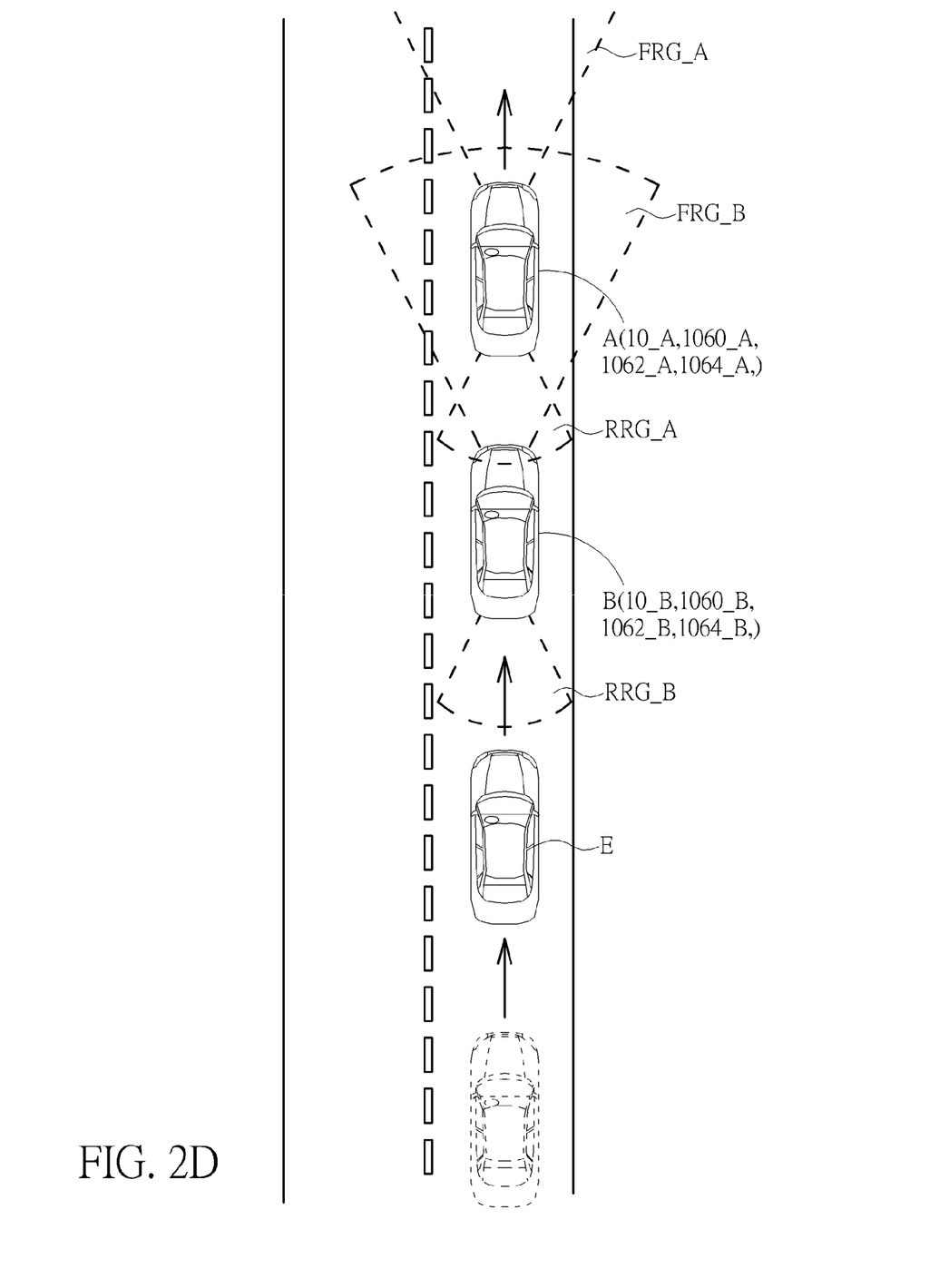

Take rear detection as an example, as FIG. 2D shown, a vehicle E approaches a rear of the vehicle B (or a blind spot in the rear of the vehicle B) when the vehicles A, B drive. When the FMCW module 1060_B of the vehicle B detects information of the vehicle E via the radar range RRG_B, the vehicle B may warn the driver of the vehicle B; in addition, the data transceiver module 1062_B of the vehicle B may send the related information of the vehicle E by broadcasting or point-to-point transmission (through the radar range FRG_B) to the data transceiver module 1062_A of the vehicle A. Therefore, the vehicle A may be informed earlier to know that there is a vehicle approaching in the rear, so as to perform pre-warning or pre-determination of target information. Furthermore, if the vehicle radar system 10 of the present invention is also installed on the vehicle E, the vehicle E may inform the vehicle B about the dynamic information of the vehicle E by broadcasting or point-to-point transmission. For example, if the vehicle E is a vehicle executing a specific mission such as an ambulance, a fire engine, a police car, the vehicle E may ask other vehicles to make way for the vehicle E earlier, so as to reduce traffic obstacles of the vehicle E and benefit the mission execution.

As can be seen from the above, the vehicle radar system 10 may perform data exchanging with other vehicles or data broadcasting to other vehicles by using the data transceiver module 1062. In addition, the data transceiver module 1062 may realize vehicle to roadside system or roadside system to vehicle communication. Moreover, roadside systems applied to the present invention may be data exchanging centers for integrating vehicle information, such as a traffic control system or a vehicle information exchanging system. The basic structure thereof comprises a plurality of base stations for performing data transceiving and one or more management devices. For example, please refer to FIGS. 3A and 3B, which are schematic diagrams of embodiments of vehicle to system communication using the vehicle radar system 10. Continuing from the examples of FIGS. 2A and 2D, in FIG. 3A, the vehicle radar systems 10 are installed on the vehicles A, B. However, the vehicles A, B are two cars entering a curve in opposite directions. In addition, a base station BS is deployed beside the curve and connected to a management device 300, such that a curve control system 30 is formed. In this example, the vehicles A, B may keep broadcasting the moving information thereof (such as speeds, angles, etc.) through the radar ranges FRG_A, FRG_B. When the base station BS receives the information broadcasted by the vehicles A, B, the management device 300 may inform the vehicles A, B about vehicle approaching via the base station BS. Alternatively, when at least one of the vehicles A, B with too fast speed or too large angle is determined, the management device 300 sends out a signal to the vehicles A, B to warn the vehicles A, B, so as to prevent traffic accident in the curve.

Figure 3A:
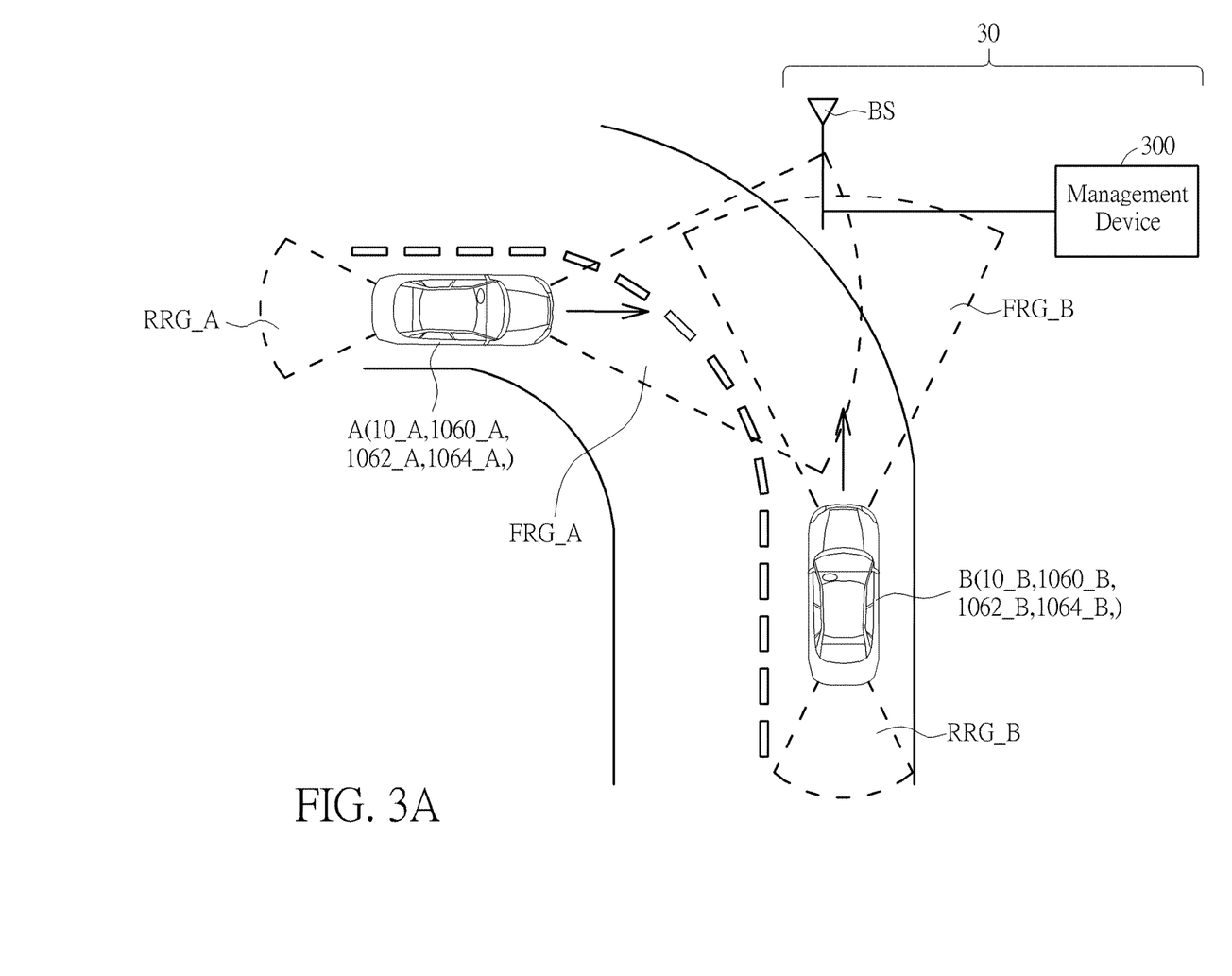
FIG. 3A to 3B are schematic diagrams of embodiments of vehicle to system communication using the vehicle radar system shown in FIG.
Figure 3B:
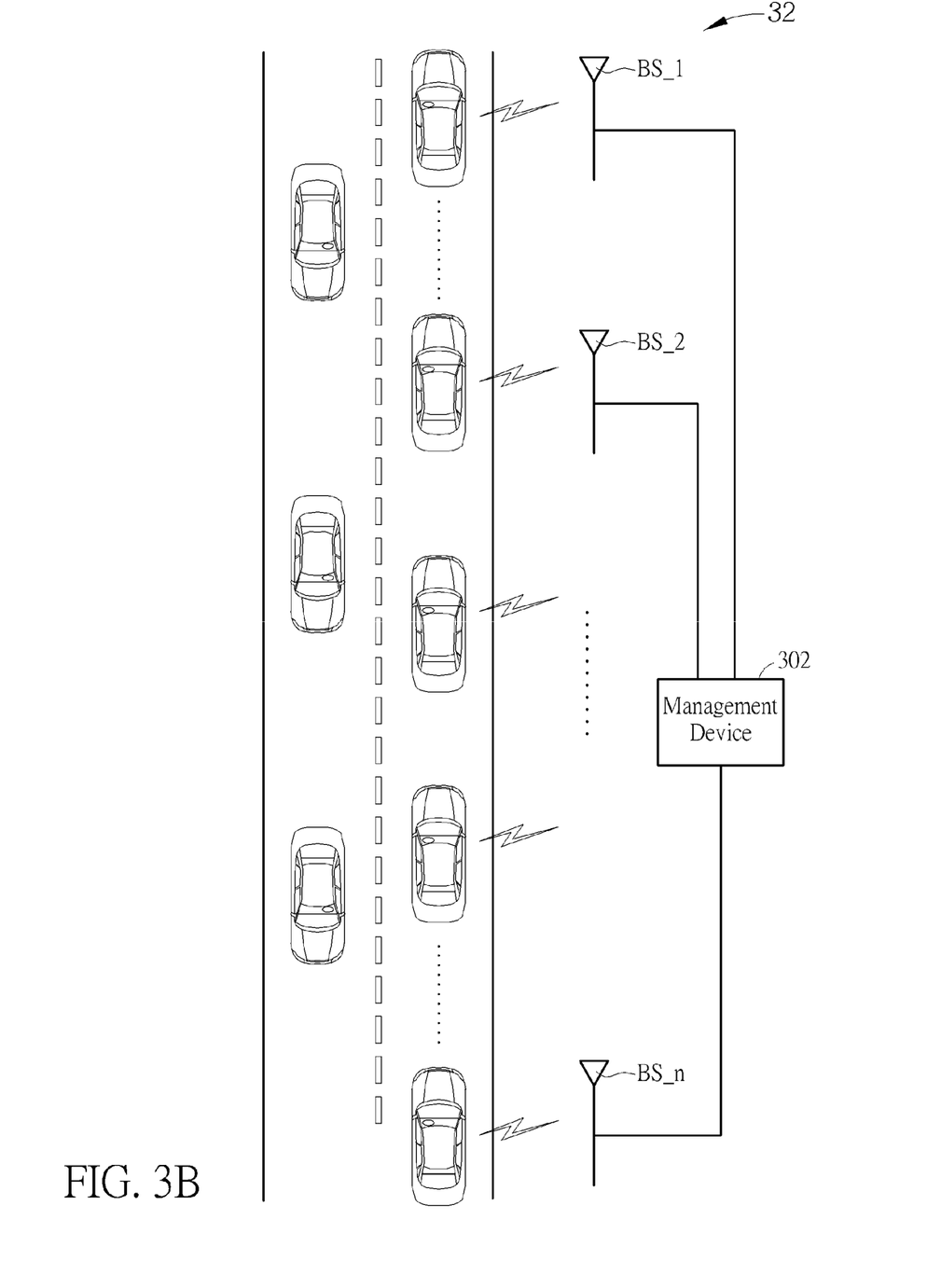

In addition, in FIG. 3B, a traffic control system 32 is installed on a road. The traffic control system 32 comprises a management device 302 and base stations BS_1-BS_n. If most of the vehicles on the road have the vehicle radar system 10 installed, and transmit information to the base stations BS_1-BS_n periodically, the management device 302 may determine traffic condition on the road earlier, so as to change traffic light adequately (e.g., periods of red lights or green lights), or inform the incoming vehicles to change roadway when there is a traffic accident, such that traffic smoothness and safety are enhanced.

Figure 4:
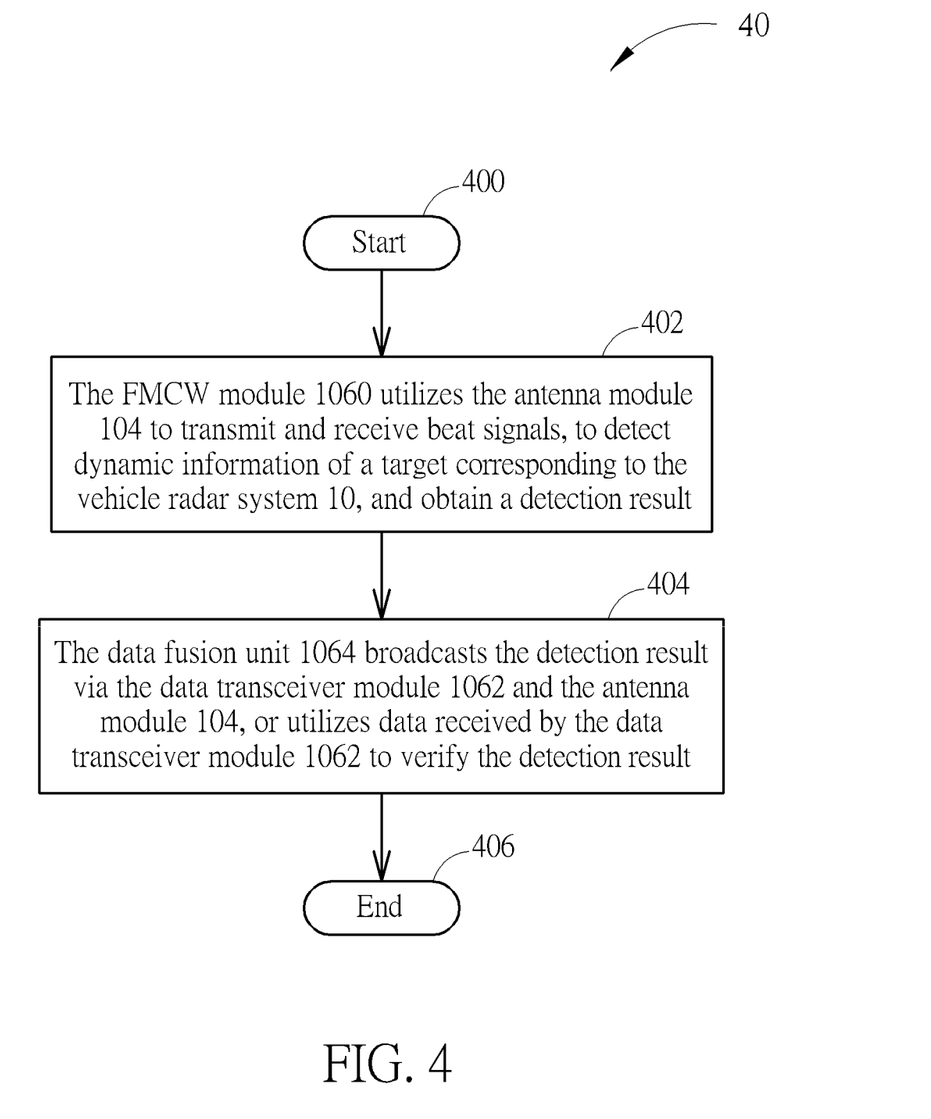
FIG. 4 is a schematic diagram of a pre-warning process according to an embodiment of the present invention.

As can be seen from the above, through the vehicle radar system 10, the present invention may perform vehicle to vehicle or vehicle to roadside system communication, such that traffic information and environment condition may be exchanged directly or indirectly between vehicles, so as to aid or improve the vehicle pre-warning system and raise the pre-warning accuracy. The operations of the vehicle radar system 10 stated in the above are further summarized as a pre-warning process 40, as shown in FIG. 4. The pre-warning process 40 comprises following steps:

Step 400: Start.

Step 402: The FMCW module 1060 utilizes the antenna module 104 to transmit and receive beat signals, to detect dynamic information of a target corresponding to the vehicle radar system 10, and obtain a detection result.

Step 404: The data fusion unit 1064 broadcasts the detection result via the data transceiver module 1062 and the antenna module 104, or utilizes data received by the data transceiver module 1062 to verify the detection result.

Step 406: End.

The detail descriptions of the pre-warning process 40 may be referred to the above. For example, FIGS. 2A-2D illustrate vehicle to vehicle communication, and FIGS. 3A-3B illustrate vehicle to roadside system communication, in which broadcasting via the data transceiver module 1062 are included. In addition, the embodiments stated above also describe that the data fusion unit 1064 may send the detection results of the FMCW module 1060 to other vehicle or roadside system via the data transceiver module 1062; the data fusion unit 1064 may utilize the data received by the data transceiver module 1062 to verify or axillary the detection result.

Figure 5A:
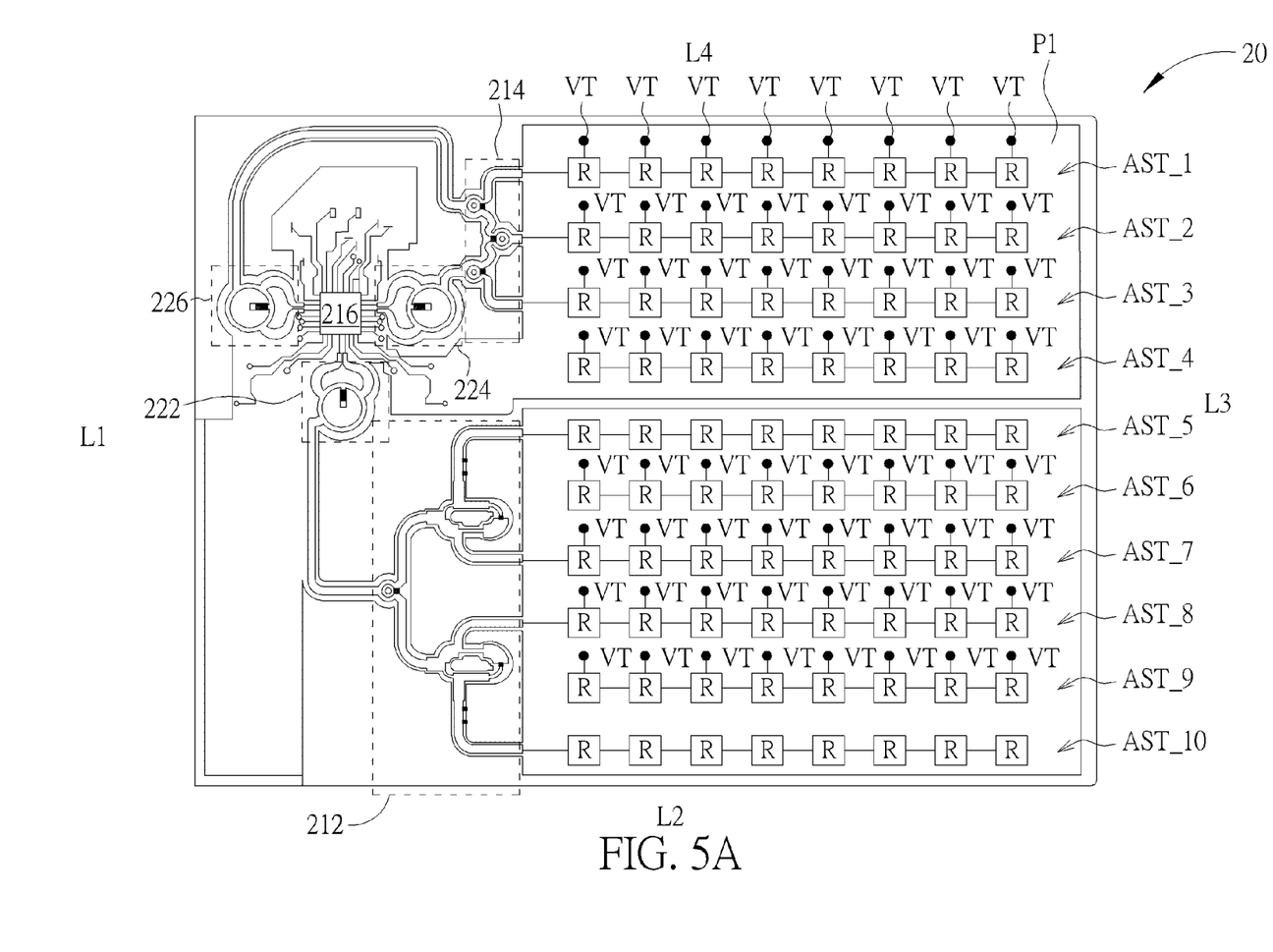
FIGS. 5A and 5B are schematic diagrams of a radio-frequency (RF) system according to an embodiment of the present invention.
Figure 5B:
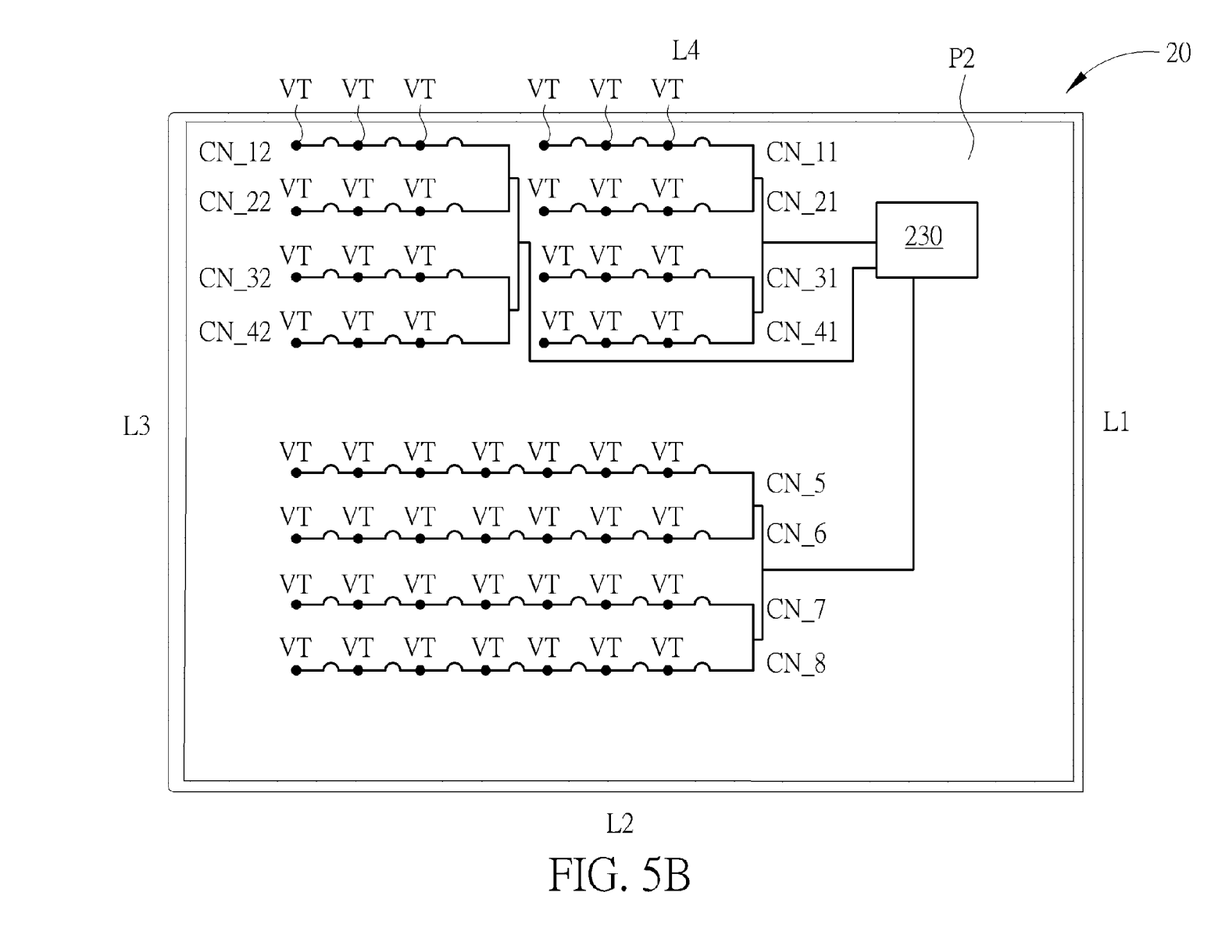

Implementations of the vehicle radar system 10 are not limited to any specific structure. For example, applicant discloses a sharing antenna and an RF device producing polarizations in different directions in U.S. patent application Ser. No. 14/691,547, which may be applied to the vehicle radar system 10 of the present invention. For example, please refer to FIGS. 5A and 5B. FIGS. 5A and 5B are FIGS. 2A and 2B in U.S. patent application Ser. No. 14/691,547, which illustrate schematic diagrams of a first plane P1 and a second plane P2 of an RF system 20. According to U.S. patent application Ser. No. 14/691,547, four sides L1-L4 are also annotated in the RF system 20 to distinguish the illustrated directions of the first plane P1 and the second plane P2. The RF system 20 comprises 10 antenna strings AST_1-AST_10, and each of the antenna strings AST_1-AST_10 comprises 8 radiation elements R. In addition to the antenna strings AST_1-AST_10 on the first plane P1 of the RF system 20, the RF system 20 further disposes a transmit power divider 212, a receive power divider 214, a first RF processing module 216 and ring-shaped couplers 222, 224, 226. Moreover, the first RF processing module 216 is coupled to the antenna strings AST_1-AST_3, AST_5, AST_7, AST_8, AST_10 through the transmit power divider 212 and the receive power divider 214, to realize a one transmit two receive (1T2R) operation. In other words, RF signals received by the antenna strings AST_1-AST_3 are delivered to two receiving terminals of the first RF processing module 216 (wherein the antenna string AST_2 are shared by the two receiving terminals of the first RF processing module 216), and RF signals outputted by a transmitting terminal of the first RF processing module 216 are emitted to the air through the antenna strings AST_5, AST_7, AST_8, AST_10. For brevity, the antenna strings AST_1-AST_3, AST_5, AST_7, AST_8, AST_10, which are connected to the first RF processing module 216, are classified as a first group of antenna strings. On the other hand, the RF system 20 disposes a second RF processing module 230 and wires CN_11, CN_12, CN_21, CN_22, CN_31, CN_32, CN_41, CN_42, CN_5-CN_8 on the second plane P2, and is coupled to the antenna strings AST_1-AST_4, AST_6-AST_9 through the connecting units VT. For brevity, the antenna strings AST_1-AST_4, AST_6-AST_9, which are connected to the second RF processing module 230, are classified as a second group of antenna strings.

As can be seen from the above, the antenna strings AST_1-AST_3, AST_7, AST_8 belong to both the first group and the second group of antenna strings. In other words, the first RF processing module 216 and the second RF processing module 230 share a part of antenna strings within the antenna strings AST_1-AST_10 (i.e., AST_1-AST_3, AST_7, AST_8). In addition, the wires CN_11, CN_12 of the RF system 20 corresponds to two segments of the same antenna string AST_1, the wires CN_21, CN_22 corresponds to two segments of the same antenna string AST_2, the wires CN_31, CN_32 corresponds to two segments of the same antenna string AST_3, and the wires CN_41, CN_42 corresponds to two segments of the same antenna string AST_4. The wires CN_11, CN_21, CN_31, CN_41 are connected to the same receiving terminal of the second RF processing module 230, the wires CN_12, CN_22, CN_32, CN_42 are connected to another receiving terminal of the second RF processing module 230, and the wires CN_5-CN_8 are connected to a transmitting terminal of the second RF processing module 230. In other words, the second RF processing module 230 is coupled to the antenna strings AST_1-AST_4, AST_6-AST_9 through the wires CN_11, CN_12, CN_21, CN_22, CN_31, CN_32, CN_41, CN_42, CN_5-CN_8 and the connecting units VT, to realize the 1T2R operation.

Therefore, the first RF processing module 216 may realize the 1T2R operation through the antenna strings AST_1-AST_3, AST_5, AST_7, AST_8, AST_10, and the second RF processing module 230 may realize the 1T2R operation through the antenna strings AST_1-AST_4, AST_6-AST_9. In other words, the RF system 20 utilizes the original 1T2R array antennas to achieve a two transmit four receive (2T4R) operation by using the sharing antenna strings. Required disposal space is spared, which is suitable for space-limited applications such as vehicle radar system.

In addition, when the first RF processing module 216 performs the 1T2R operation, the radiation elements R of each antenna string of the antenna strings AST_1-AST_3, AST_5, AST_7, AST_8, AST_10 are connected in series. When the second RF processing module 230 performs the 1T2R operation, the radiation elements R of each antenna string of the antenna strings AST_1-AST_4, AST_6-AST_9 are connected in parallel. In such a situation, when the first RF processing module 216 and the second RF processing module 230 perform operations, the RF system 20 may generate different directions of polarization. For example, through proper arrangements, if the RF system 20 presents horizontal polarization when the first RF processing module 216 operates, i.e., a first electric field generated by the antenna strings AST_1-AST_3, AST_5, AST_7, AST_8, AST_10 extends toward horizontal direction, then the RF system 20 presents vertical polarization when the second RF processing module 230 operates, i.e., a second electric field generated by the antenna strings AST_1-AST_4, AST_6-AST_9 extends toward vertical direction.

Using the RF system 20 of FIG. 5A and FIG. 5B may realize the vehicle radar system 10. In detail, the antenna module 104 may be implemented by the antenna strings AST_1-AST_10. The FMCW module 1060 and the data transceiver module 1062 may be implemented by the first RF processing module 216 and the second RF processing module 230 respectively. The first RF transceiver module 100 may be implemented by the transmit power divider 212, the receive power divider 214 and the ring-shaped couplers 222, 224, 226. The second RF transceiver module 102 may be implemented by the wires CN_11, CN_12, CN_21, CN_22, CN_31, CN_32, CN_41, CN_42, CN_5-CN_8 and the connecting units VT. In such a situation, the signal processing module 106 is implemented by adding the data fusion unit 1064 connecting to the first RF processing module 216 and the second RF processing module 230 on the RF system 20, and a basic structure of the vehicle radar system 10 is formed. Furthermore, by incorporating the pre-warning process 40 and its alternations to modify the operations of the first RF processing module 216 and the second RF processing module 230, the vehicle radar system 10 is realized.

Notably, the realization of the vehicle radar system 10 is not limited to FIGS. 2A and 3B in U.S. patent application Ser. No. 14/691,547. Adequate modification may be made according to relative content of U.S. patent application Ser. No. 14/691,547. For example, the RF system may be derived to achieve a three transmit six receive (3T6R) operation, a four transmit eight receive (4T8R) operation, etc. In addition, realization methods which achieve sharing antennas and different polarization directions are all applied to the present invention, and not limited to the embodiments stated in the above.

In summary, the vehicle radar system of the conventional art only detect outside environment or target moving conditions, miss detections and false alarms might happen because of outside traffic and environment. In comparison, the present invention utilizes vehicle to vehicle communication or vehicle to roadside system communication, such that traffic information and environment condition may be exchanged between vehicles, so as to aid or improve the vehicle pre-warning system and raise the pre-warning accuracy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pre-warning method, utilized in a vehicle radar system, wherein the vehicle radar system comprises a frequency-modulation continuous wave (FMCW) module, a data transceiver module and an antenna module, and the FMCW module and the data transceiver module share the antenna module, the pre-warning method comprising:
the FMCW module utilizing the antenna module to transmit and recive signals, to detect dynamic information of a target corresponding to the vehicle radar system, and obtaining a first detection result; and
broadcasting the first detection result via the data transceiver module and the antenna module;
wherein the target locates on a first direction corresponding to the vehicle radar system, and the step of broadcasting the first detection result via the data transceiver module and the antenna module is broadcasting the first detection result via the data transceiver module and the antenna module toward a second direction.

2. The pre-warning method of claim 1, wherein the second direction is a reverse direction of the first direction.

3. The pre-warning method of claim 1, further comprising:

receiving a second detection result of the target via the data transceiver module and the antenna module before obtaining the first detection result; and verifying the first detection result according to the second detection result after obtaining the first detection result.

4. A vehicle radar system, utilized for a vehicle, the vehicle radar system comprising:

a substrate, comprising a first plane and a second plane;

an antenna module, comprising a plurality of antenna strings, formed on the first plane of the substrate, each comprising a plurality of radiating units connected in a sequence, wherein the plurality of antenna strings are classified into a first group and a second group;

a plurality of wires, formed on the second plane of the substrate, for transmitting radio-frequency (RF) signals;

a plurality of connecting units, disposed in the substrate, for coupling the plurality of wires and antenna strings of the second group within the plurality of antenna strings;

a frequency-modulation continuous wave (FMCW) module, coupled to antenna strings of the first group within the plurality of antenna strings, for transmitting or receiving RF signals via the antenna strings of the first group, to detect dynamic information of a plurality of targets corresponding to the vehicle radar system;

a data transceiver module, coupled to the plurality of wires, for coupling to the antenna strings of the second group through the plurality of wires and the plurality of connecting units, to transmit or receive RF signals via the antenna strings of the second group, so as to perform data transmission and reception; and a data fusion unit, for integrating a detection result of the FMCW module and a data transceiving result of the data transceiver module;

wherein when the FMCW module transmits or receives RF signals via the antenna strings of the first group, a first electric field generated by the antenna strings of the first group extends toward a first direction, and when the data transceiver module transmits or receives RF signals via the antenna strings of the second group, a second electric field generated by the antenna strings of the second group extends toward a second direction different from the first direction;

wherein at least an antenna string of the plurality of antenna strings belongs to both the first group and the second group.

5. The vehicle radar system of claim 4, wherein the FMCW module is formed on the first plane of the substrate.

6. The vehicle radar system of claim 4, wherein the data transceiver module is formed on the second plane of the substrate.

7. The vehicle radar system of claim 4, wherein the first direction is perpendicular to the second direction.

8. The vehicle radar system of claim 4, further comprising a first power divider, coupled between the FMCW module and the antenna strings of the first group.

9. The vehicle radar system of claim 4, wherein after the FMCW module detects dynamic information of a target corresponding to the vehicle radar system using the antenna strings of the first group, the data fusion unit broadcasts the dynamic information of the target via the data transceiver module and the antenna strings of the second group.

10. The vehicle radar system of claim 9, wherein the target locates on a third direction corresponding to the vehicle radar system, and the data fusion unit broadcasts the dynamic information of the target via the data transceiver module and the antenna strings of the second group toward a fourth direction.

11. The vehicle radar system of claim 10, wherein the third direction is a reverse direction of the fourth direction.

12. The vehicle radar system of claim 9, wherein the data fusion unit receives an auxiliary dynamic information related to the target via the data transceiver module and the antenna strings of the second group before the FMCW module and the antenna strings of the first group obtain the dynamic information of the target; and the data fusion unit verifies the dynamic information of the target according to the auxiliary dynamic information after obtaining the dynamic information of the target via the FMCW module and the antenna strings of the first group.

* * * * *